United States Patent
Wiegner et al.

(10) Patent No.: US 11,139,544 B2
(45) Date of Patent: Oct. 5, 2021

(54) ELECTRICALLY TUNABLE RADIO-FREQUENCY COMPONENTS AND CIRCUITS

(71) Applicant: Nokia Technologies Oy, Espoo (FI)

(72) Inventors: Dirk Wiegner, Schwaikheim (DE); Wolfgang Templ, Sersheim (DE); Senad Bulja, Dublin (IE); Rose F. Kopf, Green Brook, NJ (US)

(73) Assignee: Nokia Technologies Oy, Espoo (FI)

( * ) Notice: Subject to any disclaimer, the term of this patent is extended or adjusted under 35 U.S.C. 154(b) by 105 days.

(21) Appl. No.: 16/562,871

(22) Filed: Sep. 6, 2019

(65) Prior Publication Data
US 2021/0075079 A1    Mar. 11, 2021

(51) Int. Cl.
| | | |
|---|---|---|
| H01P 1/18 | (2006.01) | |
| G02F 1/163 | (2006.01) | |
| H01P 1/20 | (2006.01) | |
| H01P 3/08 | (2006.01) | |
| G02F 1/01 | (2006.01) | |

(52) U.S. Cl.
CPC ............ *H01P 1/184* (2013.01); *G02F 1/01* (2013.01); *G02F 1/163* (2013.01); *H01P 1/20* (2013.01); *H01P 3/081* (2013.01)

(58) Field of Classification Search
CPC ... H03H 2001/0085; H01P 1/184; H01P 1/20; H01P 3/081; G02F 1/163
USPC .......................................................... 333/185
See application file for complete search history.

(56) References Cited

U.S. PATENT DOCUMENTS

| 7,369,396 B2 | 5/2008 | Maliakal |
| 8,081,114 B2 | 12/2011 | Stuart |
| 10,033,080 B2 | 7/2018 | Bulja et al. |

(Continued)

FOREIGN PATENT DOCUMENTS

| EP | 2887449 A1 | 6/2015 |
| EP | 2916364 A1 | 9/2015 |

(Continued)

OTHER PUBLICATIONS

Ta, Chien M., et al. "A 60-GHz variable delay line on CMOS for steerable antennae in wireless communication systems." 2008 Canadian Conference on Electrical and Computer Engineering. IEEE (2008): 3 pages.

(Continued)

*Primary Examiner* — Rakesh B Patel
(74) *Attorney, Agent, or Firm* — Mendelsohn Dunleavy, P.C.; Yuri Gruzdkov

(57) ABSTRACT

An electrically controllable RF-circuit element that includes at least one layer of an electrochromic material sandwiched between two corresponding layers of a solid-electrolyte material and placed adjacent and along a length of RF transmission line. In one example embodiment, the electrically controllable RF-circuit element operates as a tunable band-stop (e.g., notch) filter whose stop band can be spectrally moved by changing one or more dc-bias voltages applied across the corresponding layer stack(s). In another example embodiment, the electrically controllable RF-circuit element operates as a tunable phase shifter whose phase-shifting characteristics can be changed by changing one or more dc-bias voltages applied across the corresponding layer stack(s).

25 Claims, 14 Drawing Sheets

(56) References Cited

U.S. PATENT DOCUMENTS

| | | | |
|---|---|---|---|
| 10,187,107 B1 | 1/2019 | Bulja et al. | |
| 2012/0062976 A1* | 3/2012 | Burdis | G02F 1/153 359/266 |
| 2013/0201545 A1* | 8/2013 | Frey | B32B 37/00 359/265 |
| 2015/0325897 A1 | 11/2015 | Bulja et al. | |
| 2015/0331293 A1 | 11/2015 | Sotzing et al. | |
| 2018/0224332 A1 | 8/2018 | Ooi et al. | |
| 2018/0301783 A1 | 10/2018 | Bulja et al. | |
| 2019/0058242 A1 | 2/2019 | Tabe | |
| 2019/0204703 A1 | 7/2019 | Giri | |
| 2019/0346730 A1 | 11/2019 | Buljila et al. | |

FOREIGN PATENT DOCUMENTS

| | | |
|---|---|---|
| EP | 2916385 A1 | 9/2015 |
| EP | 3021419 A1 | 5/2016 |

OTHER PUBLICATIONS

Gong, Songbin et al. "A 60-GHz 2-bit switched-line phase shifter using SP4T RF-MEMS switches." IEEE Transactions pri Microwave Theory and Techniques 59.4 (2011): 894-900.

Nasserddine, Victoria "Millimeter-wave phase shifters based on tunable transmission lines in MEMS technology post-CMOS process." Dissertation; UniversitéGrenoble Alpes (2016): 128 pages.

Argun, Avni A. et al. "Multicolored Electrochromism in Polymers: Structures and Devices." Chemistry of Materials 16.23 (2004): 4401-4412.

Stutzman, Warren .L. et al. "Antenna Theory and Design," 2nd ed. (1998), John Wiley & Sons, New York: p. 215.

Gunter, Daniel et al. "A Comprehensive Guide to Electroactive Polymers (EAP)", University of Pittsburgh 2019 [retrieved on Jan. 13, 2020]—Retrieved from Internet: <URL: http://www.pitt.edu/~qiw4/Academic/MEMS1082/Group%202%20EAPs%20review%20-%20Final%20Paper.pdf> (25 pages ).

Wiegner, Dirk et al. "Tunable Radio-Frequency Device Having Electrochromic and Electro-Active Materials", U.S. Appl. No. 16/665,578, filed Oct. 28, 2019, (30 pages).

Mazlouman, Shahrzad Jalali, et al. "Mechanically reconfigurable antennas using electro-active polymers (EAPs)." 2011 IEEE International Symposium on Antennas and Propagation (Apsursi). IEEE (2011): 4 pages.

Bulja, S., et al. "Electro-chromic structure with a high degree of dielectric tunability." Scientific Reports 9.1 (2019): 1-7. (19 pages).

Wang, Wei-Chih, "Electroactive Polymers", Presentation, University of Washington 2006 [retrieved on Sep. 12, 2019]—Retrieved from Internet: <URL: https://depts.washington.edu/mictech/optics/sensors/week7.pdf> (118 pages).

Nang, Shutao, et al. "Tuning the fluorescent response of a novel electroactive polymer with multiple stimuli." Macromolecular Rapid Communications 34.20 (2013): 1648-1653.

\* cited by examiner

ELECTRICALLY TUNABLE RADIO-FREQUENCY COMPONENTS AND CIRCUITS

BACKGROUND

Field

Various example embodiments relate to electrical circuits and, more specifically but not exclusively, to electrically tunable radio-frequency (RF) components and circuits.

Description of the Related Art

This section introduces aspects that may help facilitate a better understanding of the disclosure. Accordingly, the statements of this section are to be read in this light and are not to be understood as admissions about what is in the prior art or what is not in the prior art.

Tunable RF elements can be used, e.g., in the field of wireless communications. Application examples include, but are not limited to adaptive matching for multi-band and/or multi-mode power amplifiers, beam steering, smart antennas, tunable filters, tunable phase shifters, etc. Some of the desirable characteristics of a tunable RF element or component suitable for these and possibly other practical applications may include some or all of: relatively low loss, relatively low power consumption, good linearity, good stability under high-voltage and/or high-current conditions, relatively large tuning range, high reliability, relatively low area usage, relatively high tuning speed, and relatively low cost.

SUMMARY OF SOME SPECIFIC EMBODIMENTS

Disclosed herein are various embodiments of an electrically controllable RF-circuit element that includes at least one layer of an electrochromic material sandwiched between two corresponding layers of a solid-electrolyte material and placed adjacent and along a length of RF transmission line. In one example embodiment, the electrically controllable RF-circuit element operates as a tunable band-stop (e.g., notch) filter whose stop band can be spectrally moved by changing one or more dc-bias voltages applied across the corresponding layer stack(s). In another example embodiment, the electrically controllable RF-circuit element operates as a tunable phase shifter whose phase-shifting characteristics can be changed by changing one or more dc-bias voltages applied across the corresponding layer stack(s).

Various embodiments can be used, e.g., to create electrically controlled, tunable circuit elements for a wide range of RF applications, with at least some of those embodiments exhibiting many of the above-listed desirable characteristics.

According to an example embodiment, provided is an apparatus comprising an electrical circuit connected to process an electrical RF signal, the electrical circuit including a first length of RF transmission line adjacent and along a first multilayered structure; and wherein the first multilayered structure comprises a first electrochromic (EC) layer and first and second ion-conductor layers vertically stacked on a substrate, the first EC layer being between the first and second ion-conductor layers.

In some embodiments of the above apparatus, the first length of RF transmission line and the first multilayered structure are parts of a circuit element configured to operate on the electrical RF signal as a tunable phase shifter.

In some other embodiments of the above apparatus, the first length of RF transmission line and the first multilayered structure are parts of a circuit element configured to operate on the electrical RF signal as a tunable band-stop filter.

According to another example embodiment, provided is an apparatus comprising an electrical circuit connected to process an electrical RF signal, the electrical circuit including a first length of RF transmission line adjacent and along a first multilayered structure, a second length of RF transmission line, and a third length of RF transmission line; wherein the second and third lengths of RF transmission line are serially connected to one another; wherein the first length of RF transmission line is end-connected as a stub between the second and third lengths of RF transmission line; and wherein the first multilayered structure comprises a first EC layer and a first ion-conductor layer vertically stacked on a substrate.

According to yet another example embodiment, provided is an apparatus comprising an electrical circuit connected to process an electrical RF signal, the electrical circuit including a length of RF transmission line adjacent and along a multilayered structure; wherein the multilayered structure comprises first and second EC layers and first, second, and third electrode layers vertically stacked on a substrate, the second electrode layer being between the first and second electrode layers, the first EC layer being between the first and second electrode layers, the second EC layer being between the second and third electrode layers; and wherein the length of RF transmission line comprises the second electrode layer.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Figure 1A:
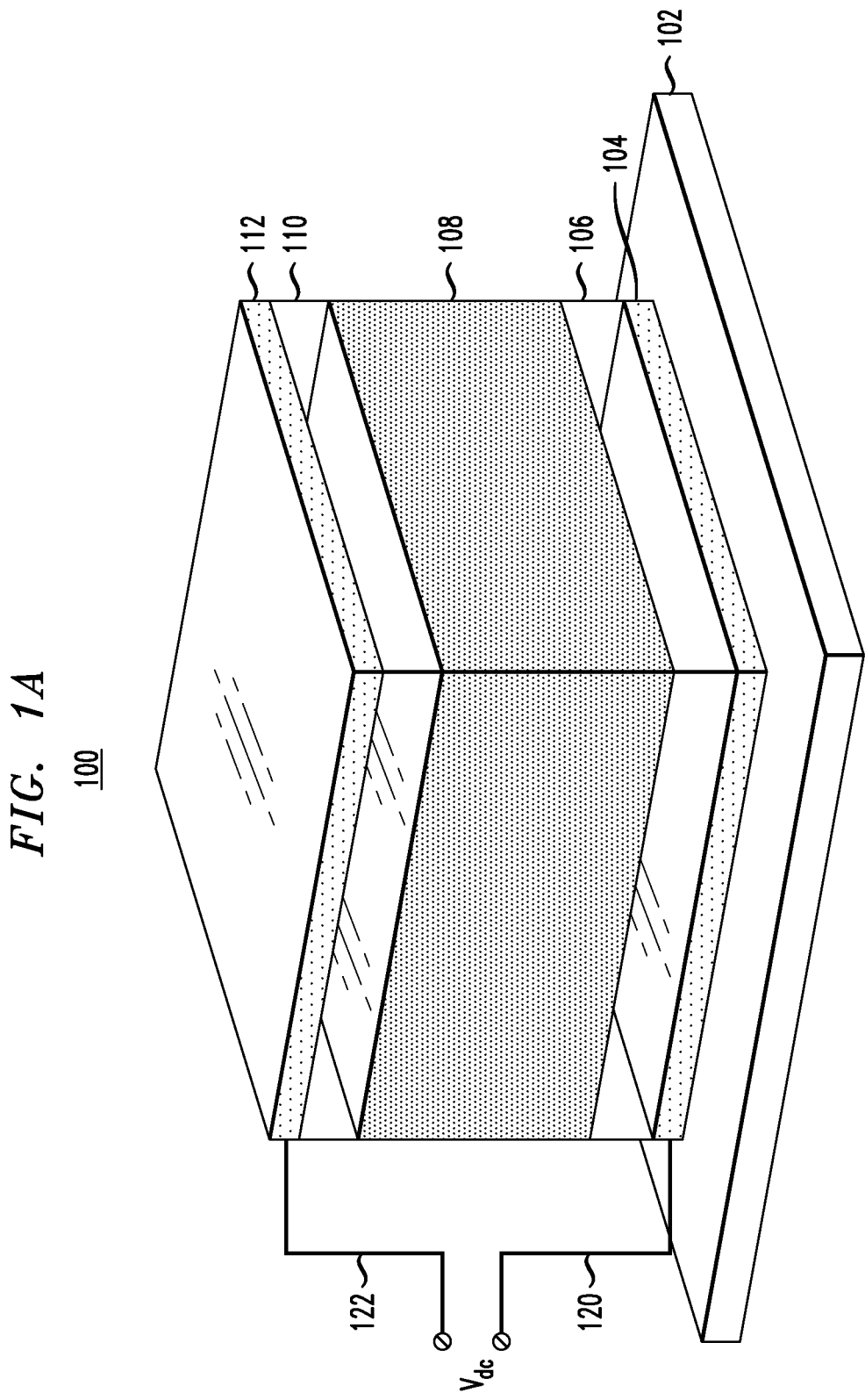
FIGS. 1A-1B schematically show multilayered structures that can be used in some embodiments.

Some embodiments disclosed herein may benefit from the use of some features disclosed in U.S. Pat. Nos. 10,033,080 and 10,187,107, U.S. Patent Application Publication Nos. 2015/0325897 and 2018/0301783, and U.S. patent application Ser. No. 15/978,370, all of which are incorporated herein by reference in their entirety.

The term "radio frequency" (often abbreviated as RF) refers to a rate of oscillation in the range from about 3 kHz to about 300 GHz. This term may be used in reference to carrier frequencies of alternating electrical currents and (wireless) radio waves and in reference to the spectral content of modulation waveforms, e.g., used in optical signals.

An electrochromic (EC) material is broadly defined as a material whose optical absorption/transmission characteristics can be reversibly changed by an application of an external voltage, light, or electric field. Representative examples of EC materials include but are not limited to (i) transition-metal and inorganic oxides, such as tungsten oxide; (ii) small organic molecules, such as viologens; and (iii) polymers, such as poly-viologens and derivatives of poly-thiophene, polypyrrole, and polyaniline.

Conventional applications of EC materials typically utilize and rely on the changes in the characteristics of EC materials in the visible range of the electromagnetic spectrum, e.g., as detailed in the review article by Avni A. Argun, Pierre-Henri Aubert, Barry C. Thompson, et al., entitled "Multicolored Electrochromism in Polymers: Structures and Devices," published in Chem. Mater., 2004, v. 16, pp. 4401-4412, which is incorporated herein by reference in its entirety. However, for at least some EC materials, changes in the visible range of the electromagnetic spectrum may be accompanied by relatively strong concurrent changes of the dielectric constant(s) in the RF or microwave range of the electromagnetic spectrum. As a result, some EC materials can be used to create electrically controlled, tunable circuit elements for certain RF and/or microwave applications.

A tunable phase shifter is a device in which the phase of an electromagnetic wave or electrical signal can be controllably shifted. Phase shifters can be analog or digital. An analog phase shifter provides a continuously variable phase change within the specified tunability range. A digital phase shifter provides a stepwise phase change within the specified tunability range, wherein a finite, relatively small number (e.g., between two and sixty-four) of discrete phase-change values can be set.

The convention followed for tunable phase shifters is that the phase-shifter configuration corresponding to the smallest available phase shift is referred to as the "reference" or "OFF" state, and the phase-shifter configuration corresponding to the largest available phase shift is referred to as the "ON" state. The phase-shift difference between the OFF and ON states is referred to as the total phase variance.

A band-stop filter or band-rejection filter is a filter that passes most RF frequencies unaltered, but attenuates those in a specific frequency range to very low levels. A band-stop filter has frequency characteristics that are substantially opposite to the frequency characteristics of a band-pass filter. A notch filter is a band-stop filter with a relatively narrow stop band. For example, if a notch filter has a stop band between 1500 MHz to 1550 MHz, then the notch filter will pass substantially unaltered all signals with frequencies from dc (direct current, or 0 Hz) to 1500 MHz and then higher than 1550 MHz. On the other hand, this notch filter will substantially block (e.g., stop) signals with frequencies between 1500 MHz and 1550 MHz and possibly some of the higher harmonics of such signals.

FIG. 1A shows a schematic view of a multilayered structure 100 that can be used in some embodiments. Structure 100 has a substrate 102 on which the other layers of the structure may be formed during the fabrication process. In one example embodiment, substrate 102 can be a glass, semiconductor, or dielectric layer. In some embodiments, substrate 102 may itself be a multilayered structure.

In an example embodiment, structure 100 further includes layers 104, 106, 108, 110, and 112.

Layers 104 and 112 are electrode layers that are configured to be electrically connected, by way of electrical leads 120 and 122, to an external voltage source, e.g., supplying a dc bias voltage, $V_{dc}$, as indicated in FIG. 1A. In an example embodiment, layer 112 is made of an electrically conducting material (e.g., a metal or metallic alloy) and can operate as an anode. Layer 104 is also made of an electrically conducting material and can operate as a cathode. The electrically conducting material of layer 112 may be the same as or different from the electrically conducting material of layer 104. In some embodiments, one or both of electrode layers 104 and 112 may be omitted from the structure. If electrode layer 104 is omitted, then electrical lead 120 may be directly electrically connected to layer 106, e.g., using a relatively large area connection for uniform biasing. If electrode layer 112 is omitted, then electrical lead 122 may be directly electrically connected to layer 110 in a similar manner. In some embodiments, one or both of electrode layers 104 and 112 may include gold.

In some embodiments, electrode layer 104 can be implemented using a base (e.g., ground) plane of the corresponding RF circuit. Electrode layer 112 can be implemented using a strip waveguide formed by patterning and etching an RF metal layer of the corresponding RF circuit.

Layer 108 is an EC layer that may comprise any suitable EC material, such as $WO_3$, $TiO_2$, $MoO_3$, $Ta_2O_5$, $Nb_2O_5$, or any of other above-mentioned or known EC materials. In some embodiments, EC layer 108 may have first and second sub-layers (not explicitly shown in FIG. 1A, see FIG. 1B). In such embodiments, the first sub-layer may be an EC sub-layer (i.e., made of any suitable EC material indicated above), and the second sub-layer may be an ion-storage sub-layer. In some embodiments, it may be beneficial to make the second sub-layer of an EC material that exhibits electrochromic characteristics complementary to those of the first EC sub-layer. In some embodiments, the second sub-layer may be made of NiO, $Cr_2O_3$, $MnO_2$, $FeO_2$, $CoO_2$, $RhO_2$, and/or $IrO_2$.

Layers 106 and 110 are ion-conductor (e.g., solid electrolyte) layers that serve as reservoirs of ions for injection into/ejection from EC layer 108. It may be beneficial to make ion-conductor layers 106 and 110 from a material that has different conductivities for ions and electrons. In some embodiments, layers 106 and 110 may be made of different respective materials. In some embodiments, layers 106 and 110 may comprise the same material, e.g., lithium niobate ($LiNbO_3$).

When voltage is applied to electrical leads 120 and 122, a corresponding electric field is generated between electrode layers 104 and 112. This electric field causes ions to be injected into and/or ejected from EC layer 108. The resulting electrical charge in EC layer 108 is neutralized by a corresponding charge-balancing counter flow of electrons. This injection/ejection of ions and electrons typically causes a change of optical properties, such as color, in EC layer 108 due to electrochromism. This injection/ejection of ions and electrons also typically causes a change of the dielectric constant in EC layer 108 in the RF or microwave range of the electromagnetic spectrum, with said change being voltage-dependent.

Figure 1B:
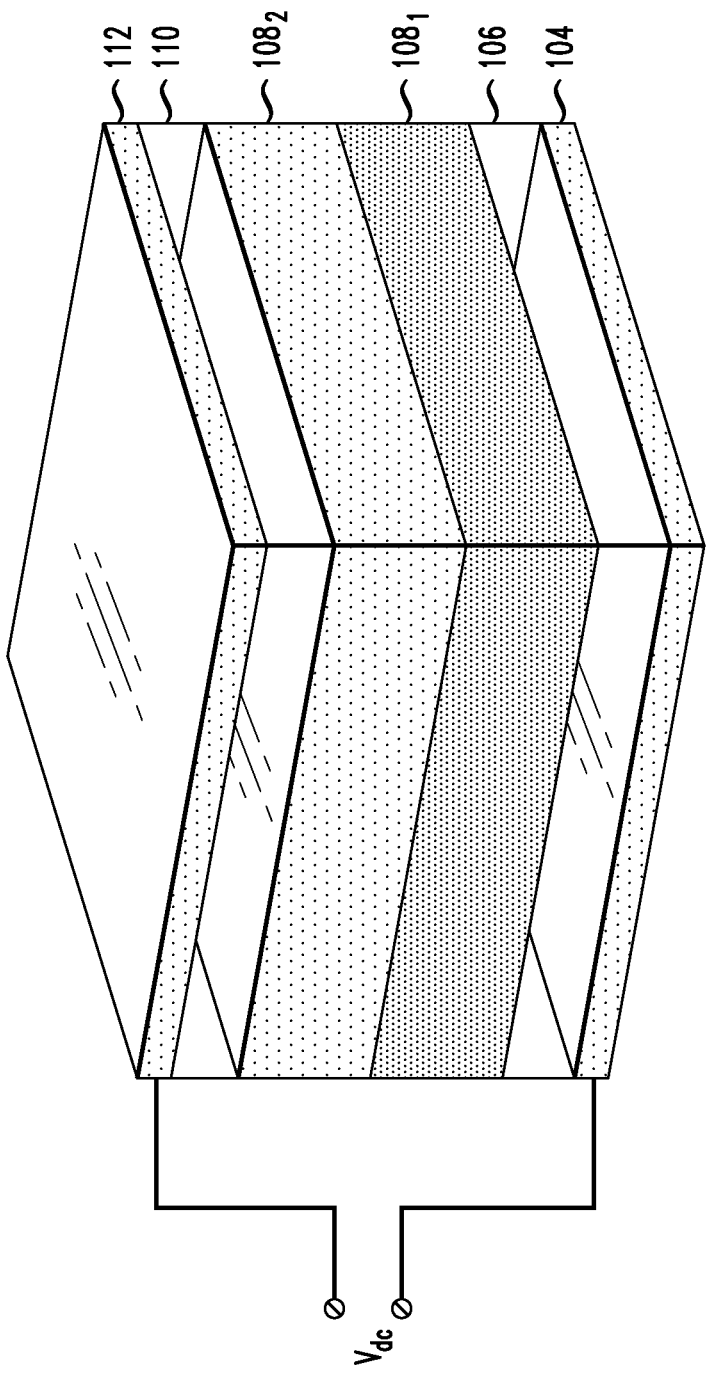

FIG. 1B shows a schematic view of a multilayered structure 100' that can be used in some embodiments. In structure 100', layer 108 comprises sub-layers $108_1$ and $108_2$. Sub-layer $108_1$ is an EC sub-layer that can be made of any suitable EC material indicated above. Sub-layer $108_2$ is an ion-storage sub-layer. In some embodiments, it may be beneficial to make the second sub-layer of an EC material that exhibits electrochromic characteristics complementary to those of sub-layer $108_1$. In some embodiments, sub-layer $108_1$ may comprise NiO, $Cr_2O_3$, $MnO_2$, $FeO_2$, $CoO_2$, $RhO_2$, or $IrO_2$.

Structure 100' further differs from structure 100 of FIG. 1A in that substrate 102 is not present there. For example, substrate 102 can be removed after the fabrication process is completed.

In general, in some embodiments of structure 100 and structure 200 (see FIG. 2), the substrate layer, such as substrate 102, may be optional.

Figure 2:
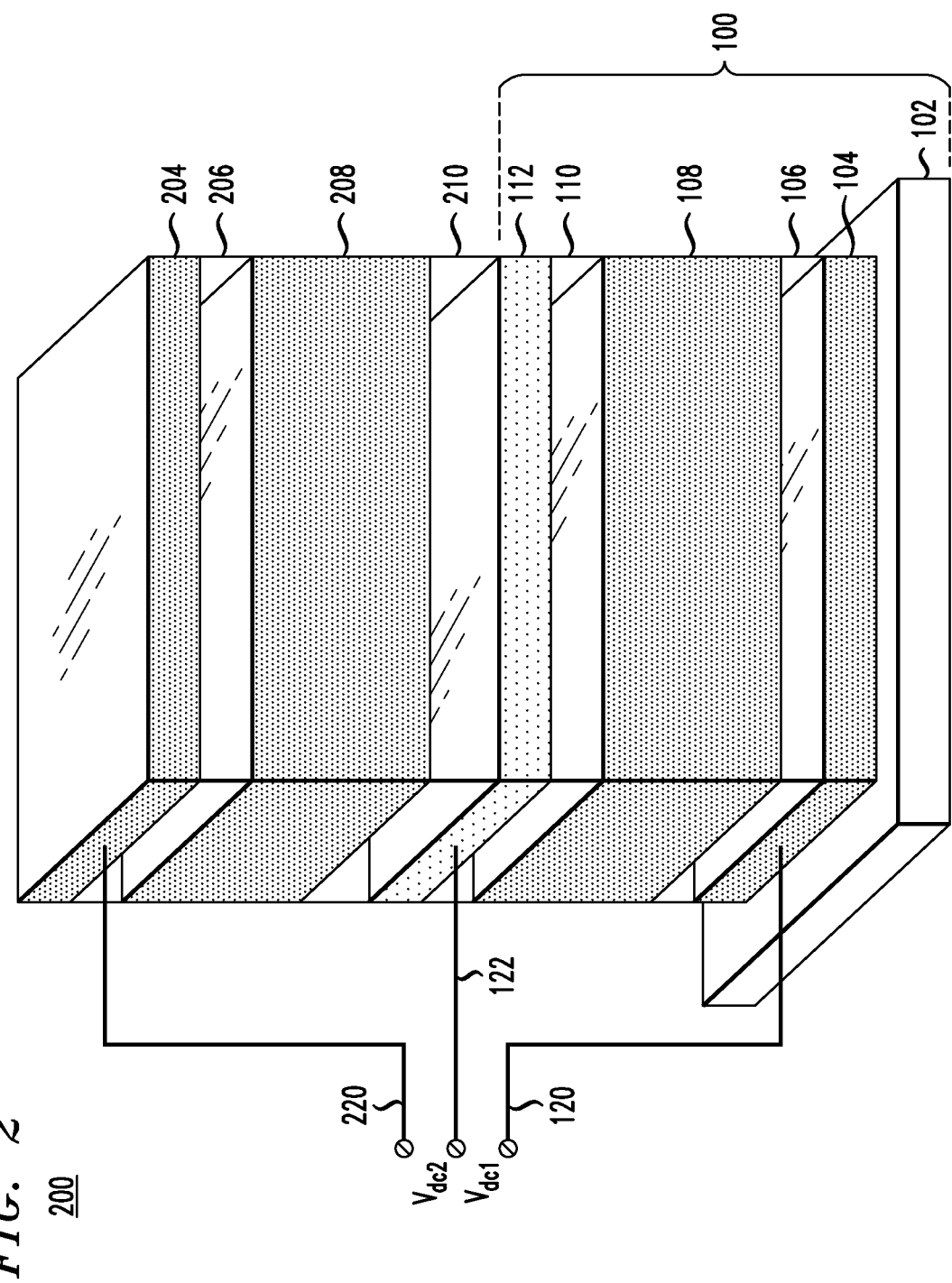
FIG. 2 schematically shows another multilayered structure that can be used in some embodiments.

FIG. 2 shows a schematic view of a multilayered structure 200 that can be used in some embodiments. Structure 200 includes structure 100 (FIG. 1) and has additional layers 204, 206, 208, and 210 stacked on top of structure 100 as indicated in FIG. 2. Layer 204 is an additional electrode layer that can be electrically biased with respect to electrode layer 112 using an electrical lead 220. Layers 206 and 210 are additional ion-conductor (e.g., solid electrolyte) layers. Layer 208 is an additional EC layer for which layer 206 and 210 serve as ion reservoirs.

Conceptually, structure 200 can be understood as comprising two vertically stacked structures 100, wherein electrode layer 112 is a common (shared) layer for those two structures 100. As used herein, the term "vertical" refers to the direction that is orthogonal to a main (e.g., of the largest area) surface of substrate 102. Electrical leads 120 and 220 can be used to individually and/or independently bias electrode layers 104 and 204 with respect to the common electrode layer 112, which is connected to electrical lead 122. The corresponding two bias voltages are denoted in FIG. 2 as $V_{dc1}$ and $V_{dc2}$, respectively.

In some embodiments, electrode layer 204 may be nominally identical to electrode layer 104. Ion-conductor layer 206 may be nominally identical to ion-conductor layer 106. EC layer 208 may be nominally identical to EC layer 108. Ion-conductor layer 210 may be nominally identical to ion-conductor layer 110.

As used herein, the term "nominally identical" should be construed to at least mean "made of the same chemical compound(s)." This term may also imply that the two layers have substantially the same geometric sizes (e.g., within fabrication tolerances).

Figure 13:
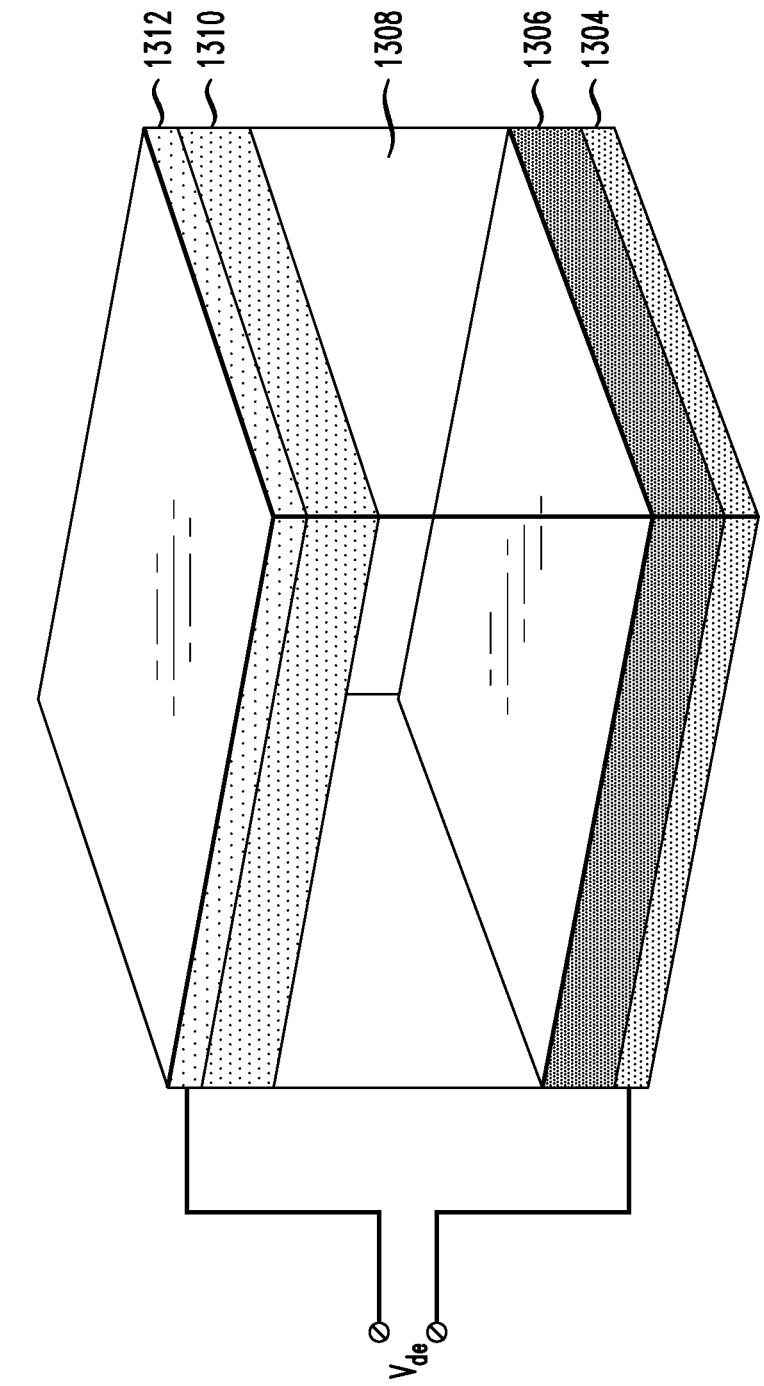
FIG. 13 schematically shows a conventional EC cell that can be used in some embodiments.

In some embodiments, structure 200 can be modified such that the stack of layers 106, 108, and 110 is replaced by the stack of layers 1306, 1308, and 1310 described in reference to FIG. 13.

Figure 3:
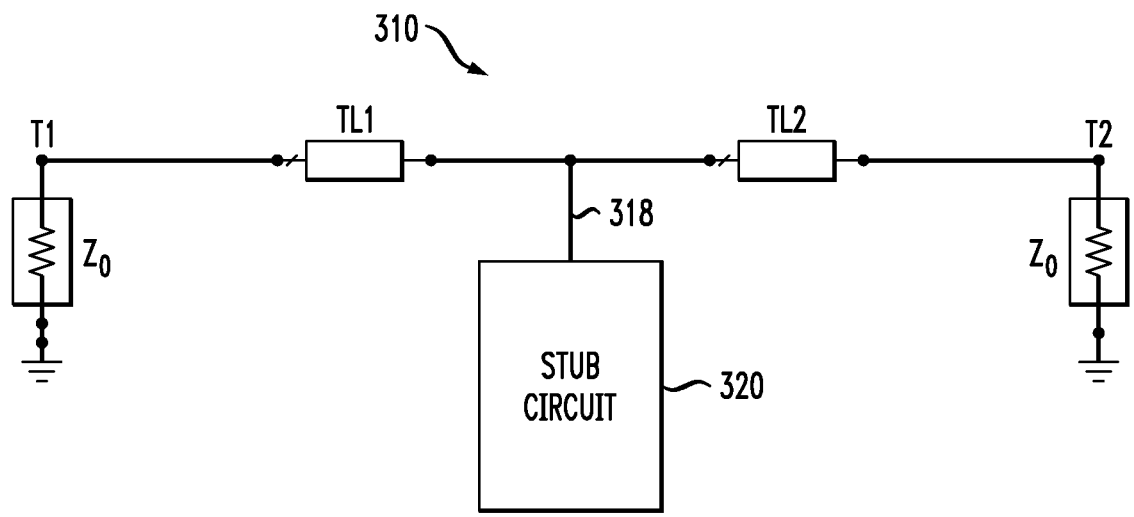
FIG. 3 shows a circuit diagram of an electrical circuit in which the multilayered structure of FIG. 1 or FIG. 2 can be used according to an embodiment.

In some embodiments, structure 200 can be further modified such that the stack of layers 206, 208, and 210 is replaced by a second instance of the stack of layers 1306, 1308, and 1310. The modified structure 200 obtained in this manner therefore comprises two stacks of layers 1306, 1308, and 1310, with the first stack being located between electrode layers 104 and 112, and the second stack being located between electrode layers 204 and 112. FIG. 3 shows a circuit diagram of an electrical circuit 300 according to an embodiment. In an example embodiment, circuit 300 can operate as an electrically tunable notch filter, e.g., as demonstrated by the results shown in FIGS. 6-7. The tunability of circuit 300 can be realized using structure 100 (FIGS. 1A-1B) or structure 200 (FIG. 2) located in a stub circuit 320. Example embodiments of stub circuit 320 are described below in reference to FIGS. 4 and 5.

Circuit 300 comprises an RF transmission line 310 that connects terminals T1 and T2 using two serially connected transmission-line sections, labeled TL1 and TL2, respectively. In an example embodiment, each of sections TL1 and TL2 can be implemented, e.g., using a respective electrically conducting microstrip formed on a dielectric over a ground plane of the circuit, as known in the pertinent art. Transmission line 310 can be impedance matched to a standard impedance $Z_0$, e.g., 50 Ohm, e.g., as indicated in FIG. 3. Alternative implementations of transmission line 310 and sections TL1 and TL2 are also possible, e.g., as known in the pertinent art.

Stub circuit 320 is connected to transmission line 310 between sections TL1 and TL2, as indicated in FIG. 3, to create an RF stub thereat. As used herein, the term "stub" refers to a length of RF transmission line or waveguide that is connected to the corresponding pass-through (e.g., main) RF transmission line (e.g., 310, in FIG. 3) at one stub end only. The second end of the stub may either be left as an open circuit or be short-circuited. Depending on the stub's implementation and circuit configuration, different stubs may function as capacitors, inductors, and/or resonant RF circuits.

Figure 4:
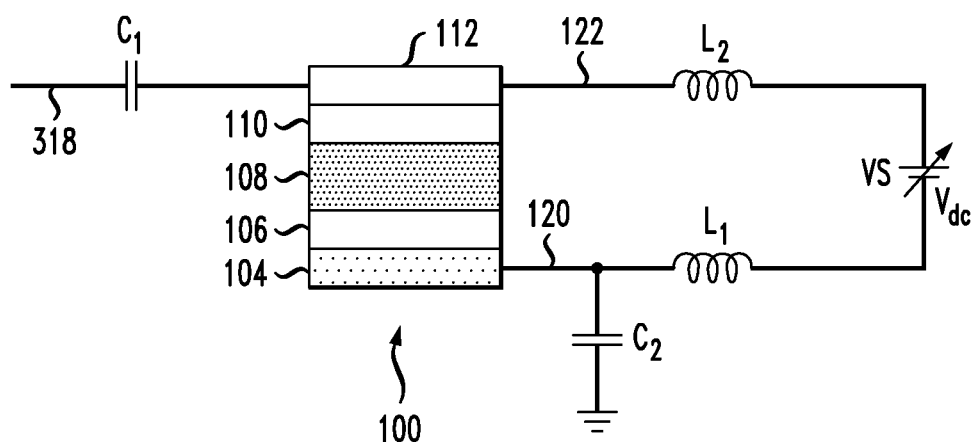
FIG. 4 shows a circuit diagram of a stub circuit that can be used in the electrical circuit of FIG. 3 according to an embodiment.

FIG. 4 shows a circuit diagram of stub circuit 320 according to an embodiment. An electrical terminal 318 shown in both FIG. 3 and FIG. 4 indicates how this embodiment of stub circuit 320 is connected to transmission line 310.

Stub circuit 320 of FIG. 4 comprises a variable voltage source VS connected to apply the bias voltage $V_{dc}$ across structure 100 (also see FIG. 1). The bias voltage $V_{dc}$ can be changed by appropriately controlling the voltage source VS, as known in the pertinent art. Inductors $L_1$ and $L_2$ are used to provide dc coupling of the voltage source VS to structure 100. Since inductors $L_1$ and $L_2$ have relatively high impedances at radio frequencies, voltage source VS is substantially RF-decoupled from structure 100. Capacitor $C_1$ is connected to provide RF coupling of electrode layer 112 of structure 100 to electrical terminal 318 and further to transmission line 310 (see FIG. 3). Capacitor $C_1$ also serves to substantially decouple electrical terminal 318 and transmission line 310 from the dc voltage applied to structure 100 by the voltage source VS. Capacitor $C_2$ may be optional and serves to electrically float electrode layer 104 of structure 100 with respect to the ground potential, when appropriate or necessary. In some embodiments, electrode layer 104 can be directly electrically connected to the corresponding ground terminal of the circuit.

In some embodiments, structure 100 in stub circuit 320 can be replaced by EC cell 1300 (FIG. 13).

Figure 5:
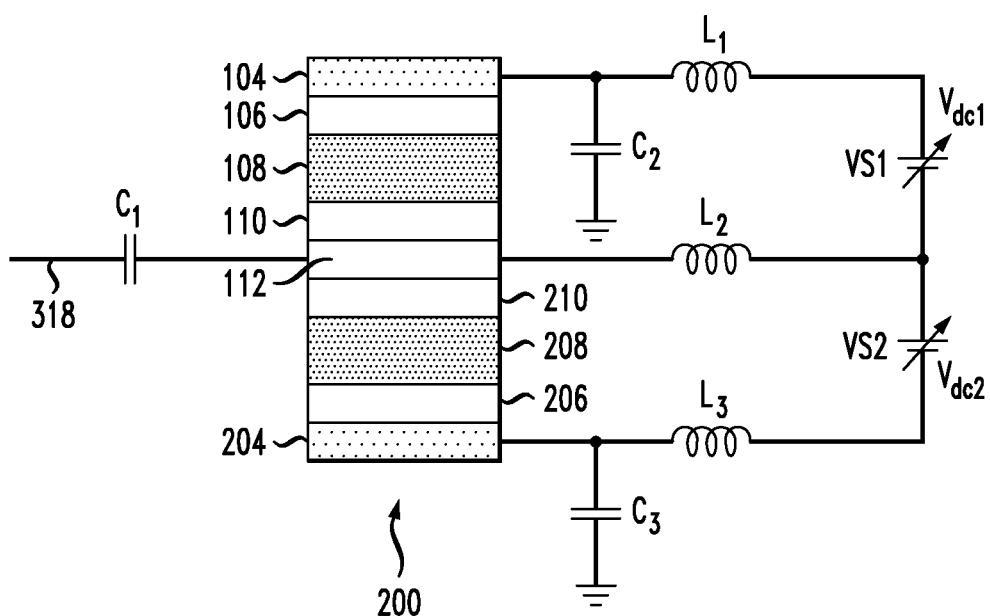
FIG. 5 shows a circuit diagram of a stub circuit that can be used in the electrical circuit of FIG. 3 according to another embodiment.

FIG. 5 shows a circuit diagram of stub circuit 320 according to another embodiment. An electrical terminal 318 shown in both FIG. 3 and FIG. 5 indicates how this embodiment of stub circuit 320 is connected to transmission line 310.

Stub circuit 320 of FIG. 5 comprises a variable voltage source VS1 connected to apply the bias voltage $V_{dc1}$ between electrode layers 104 and 112 of structure 200 (also see FIG. 2). Stub circuit 320 of FIG. 5 further comprises a variable voltage source VS2 connected to apply the bias voltage $V_{dc2}$ between electrode layers 204 and 112 of structure 200 (also see FIG. 2). The bias voltages $V_{dc1}$ and $V_{dc2}$ can be changed individually by appropriately controlling the voltage sources VS1 and VS2. Inductors $L_1$ and $L_2$ are used to provide dc coupling of the voltage source VS1 to the corresponding portion of structure 200. Inductors $L_2$ and $L_3$ are similarly used to provide dc coupling of the voltage source VS2 to another portion of structure 200. Since inductors $L_1$, $L_2$, and $L_3$ have relatively high impedances at radio frequencies, voltage sources VS1 and VS2 are substantially RF-decoupled from structure 200. Capacitor $C_1$ is connected to provide RF coupling of electrode layer 112 of structure 200 to electrical terminal 318 and further to transmission line 310 (see FIG. 3). Capacitor $C_1$ also serves to substantially decouple electrical terminal 318 and transmission line 310 (FIG. 3) from the dc voltages applied to structure 200 by the voltage sources VS1 and VS2. Capacitor $C_2$ may be optional and serves to electrically float electrode layer 104 of structure 200 with respect to the ground potential, when appropriate or necessary. Capacitor $C_3$ may also be optional and serves to electrically float electrode layer 204 of structure 200 with respect to the ground potential, when appropriate or necessary. In some embodiments, one or both of electrode layers 104 and 204 can be directly electrically connected to the corresponding ground terminal(s) of the circuit.

Figure 6A:
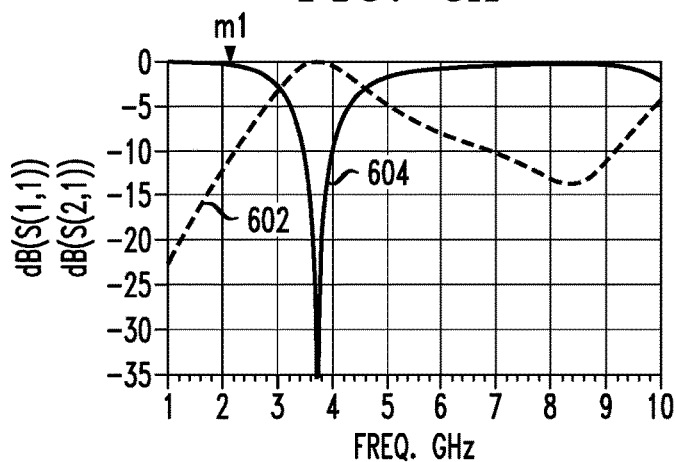
FIGS. 6A-6C graphically illustrate certain frequency characteristics of the electrical circuit of FIG. 3 according to an embodiment.
Figure 6B:
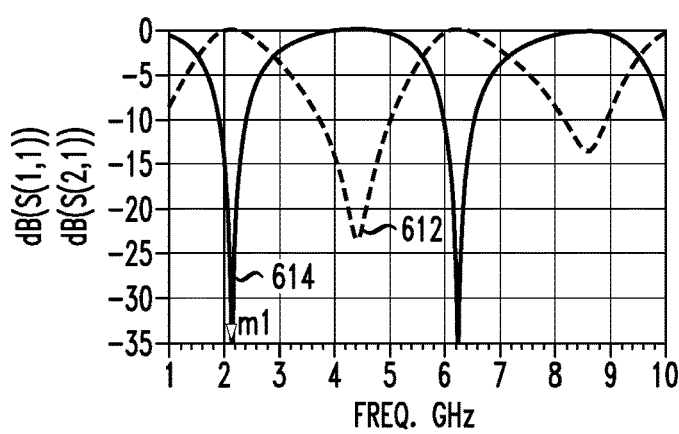
Figure 6C:
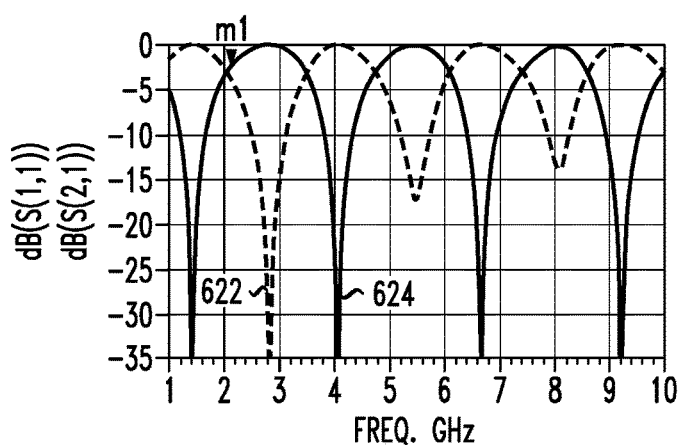

FIGS. 6A-6C graphically illustrate certain frequency characteristics of circuit 300 (FIG. 3) having an embodiment of stub circuit 320 corresponding to FIG. 4. More specifically, each of FIGS. 6A-6C graphically shows the frequency dependence of the amplitudes of S-parameters S(1,1) and S(2,1) of circuit 300 at different respective values of the bias voltage $V_{dc}$ (also see FIG. 4). As already indicated above, a change of the bias voltage $V_{dc}$ causes a corresponding change of the effective dielectric constant of structure 100. The S-parameter S(1,1) represents the reflection coefficient (or return loss) of circuit 300 at terminal T1 (see FIG. 3) measured in dB. The S-parameter S(2,1) represents the transmission coefficient (or insertion loss) of circuit 300 for RF-signal transmission from terminal T1 to terminal T2 (also see FIG. 3) measured in dB.

Referring to FIG. 6A, curves 602 and 604 shown therein correspond to the S-parameters S(1,1) and S(2,1), respectively, and were obtained by numerical simulations in which the bias voltage $V_{dc}$ was set to the value $V_A$ that resulted in the effective relative dielectric constant, $\varepsilon_r$, of EC layer 108 to be $\varepsilon_r=1$. The marker m1 on curve 604 is located at 2.14 GHz and indicates the S(2,1) value of −0.366 dB.

Referring to FIG. 6B, curves 612 and 614 shown therein correspond to the S-parameters S(1,1) and S(2,1), respectively, and were obtained by numerical simulations in which the bias voltage $V_{dc}$ was set to the value $V_B$ that resulted in the effective relative dielectric constant, $\varepsilon_r$, of EC layer 108 to be $\varepsilon_r=4$. The marker m1 on curve 614 is located at 2.14 GHz and indicates the S(2,1) value of −56.665 dB.

Referring to FIG. 6C, curves 622 and 624 shown therein correspond to the S-parameters S(1,1) and S(2,1), respectively, and were obtained by numerical simulations in which the bias voltage $V_{dc}$ was set to the value $V_C$ that resulted in the effective relative dielectric constant, $\varepsilon_r$, of EC layer 108 to be $\varepsilon_r=10$. The marker m1 on curve 624 is located at 2.14 GHz and indicates the S(2,1) value of −2.291 dB.

Thus, the results shown in FIGS. 6A-6C indicate that it is theoretically possible to change the amplitude of the S-parameter S(2,1) at 2.14 GHz by more than 50 dB using the bias voltage values in the range between $V_{dc}=V_A$ and $V_{dc}=V_C$. The corresponding stop bands have a 3-dB width of about 1 GHz, which qualifies this embodiment of circuit 300 to be referred to as a notch filter. A person of ordinary skill in the art will understand that the 3-dB bandwidth is a design parameter that can be varied by appropriately changing the pertinent physical characteristics of circuit 300. Other stop bands, e.g., indicated by curves 614 and 624 can also be utilized in various filtering applications of this embodiment of circuit 300.

Figure 7A:
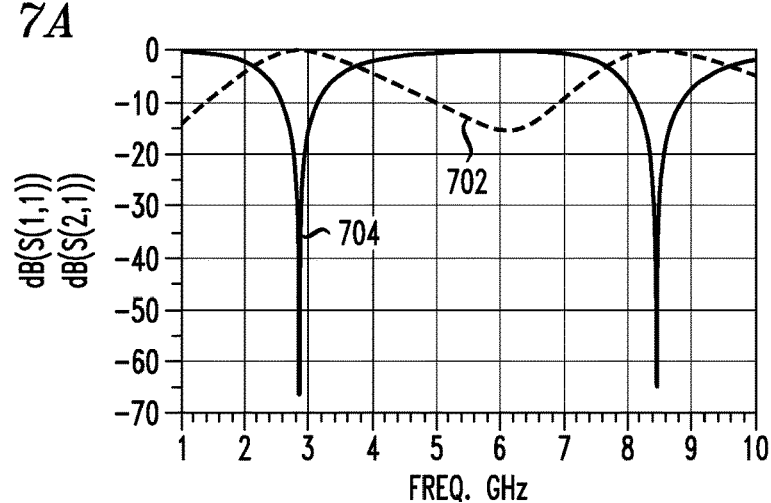
FIGS. 7A-7C graphically illustrate certain frequency characteristics of the electrical circuit of FIG. 3 according to another embodiment.
Figure 7B:
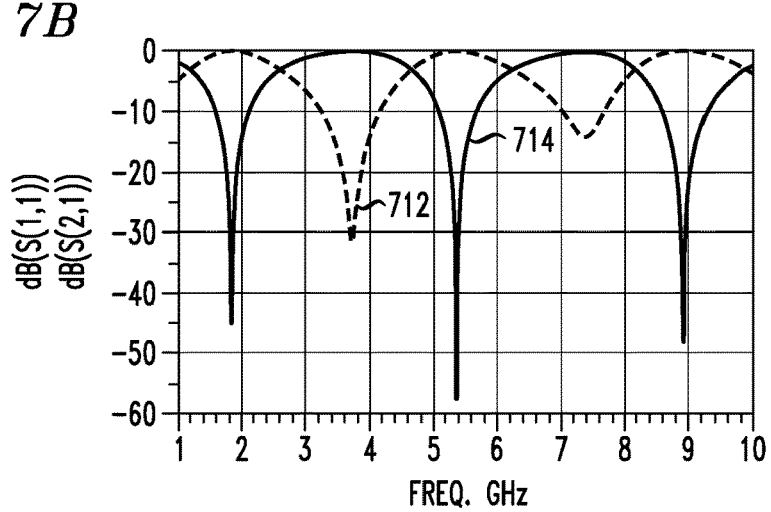
Figure 7C:
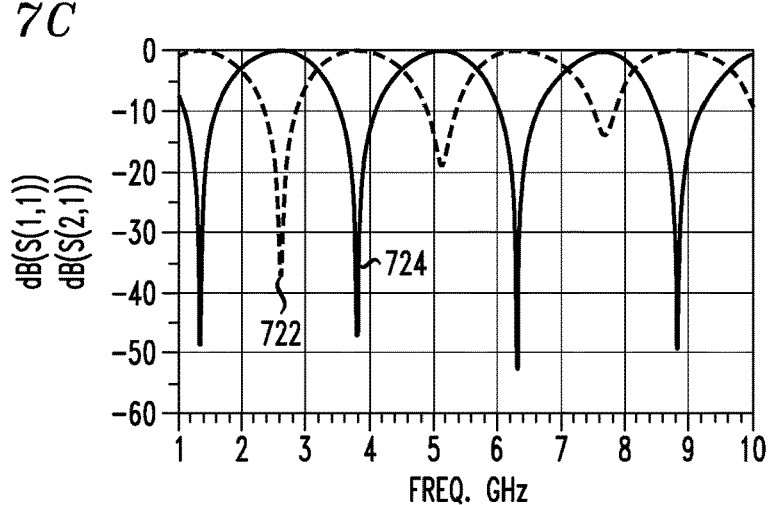

FIGS. 7A-7C graphically illustrate certain frequency characteristics of circuit 300 (FIG. 3) having an embodiment of stub circuit 320 corresponding to FIG. 5. More specifically, each of FIGS. 7A-7C graphically shows the frequency dependence of the amplitudes of the S-parameters S(1,1) and S(2,1) of circuit 300 at different respective combinations of the bias voltages $V_{dc1}$ and $V_{dc2}$ (also see FIG. 5). As already indicated above, a change of one or both of the bias voltages $V_{dc1}$ and $V_{dc2}$ causes a corresponding change of the effective dielectric constant(s) of structure 200.

Referring to FIG. 7A, curves 702 and 704 shown therein correspond to the S-parameters S(1,1) and S(2,1), respectively, and were obtained by numerical simulations in which the bias voltages $V_{dc1}$ and $V_{dc2}$ were set to the values $V_{A1}$ and $V_{A2}$, respectively, that resulted in the effective relative dielectric constant, $\varepsilon_{r1}$, of EC layer 108 to be $\varepsilon_{r1}=1$, and in the effective relative dielectric constant, $\varepsilon_{r2}$, of EC layer 208 to be $\varepsilon_{r2}=1$. Note that curve 704 exhibits two narrow stop bands with minima located at about 2.8 GHz and 8.5 GHz, respectively.

Referring to FIG. 7B, curves 712 and 714 shown therein correspond to the S-parameters S(1,1) and S(2,1), respectively, and were obtained by numerical simulations in which the bias voltages $V_{dc1}$ and $V_{dc2}$ were set to the values $V_{A1}$ and $V_{B2}$, respectively, that resulted in the effective relative dielectric constant, $\varepsilon_{r1}$, of EC layer 108 to be $\varepsilon_{r1}=1$, and in the effective relative dielectric constant, $\varepsilon_{r2}$, of EC layer 208 to be $\varepsilon_{r2}=4$. Note that curve 714 exhibits three narrow stop bands with minima located at about 1.8 GHz, 5.4 GHz, and 8.9 GHz, respectively.

Referring to FIG. 7C, curves 722 and 724 shown therein correspond to the S-parameters S(1,1) and S(2,1), respectively, and were obtained by numerical simulations in which the bias voltages $V_{dc1}$ and $V_{dc2}$ were set to the values $V_{C1}$ and $V_{C2}$, respectively, that resulted in the effective relative dielectric constant, $\varepsilon_{r1}$, of EC layer 108 to be $\varepsilon_{r1}=5$, and in the effective relative dielectric constant, $\varepsilon_{r2}$, of EC layer 208 to be $\varepsilon_{r2}=5$. Note that curve 724 exhibits four narrow stop bands with minima located at about 1.3 GHz, 3.8 GHz, 6.3 GHz, and 8.8 GHz, respectively.

The above results indicate that structure 200 can beneficially support a tuning effect that is similar to that of structure 100, but at considerably narrower variation of the effective dielectric constant or bias voltages.

A person of ordinary skill in the art will understand that various stop-band combinations may beneficially be realized with this particular embodiment of circuit 300 by appropriately changing the bias voltages $V_{dc1}$ and $V_{dc2}$.

Figure 8:
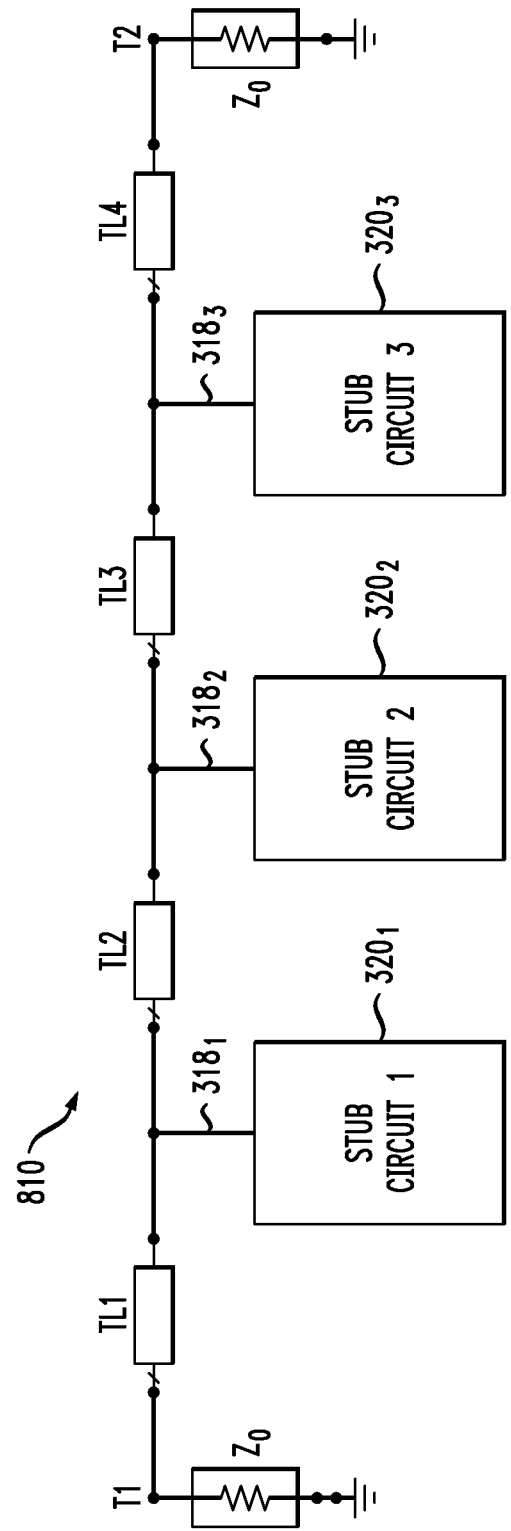
FIG. 8 shows a circuit diagram of an electrical circuit in which the multilayered structures of FIG. 1 and/or FIG. 2 can be used according to another embodiment.

FIG. 8 shows a circuit diagram of an electrical circuit 800 according to another embodiment. In an example embodiment, circuit 800 can operate as an electrically tunable multiband notch filter, e.g., as demonstrated by the results shown in FIGS. 9A-9C. The tunability of circuit 800 can be realized using structures 100 (FIG. 1) and/or structures 200 (FIG. 2) located in stub circuits $320_1$-$320_3$. Example embodiments of stub circuits $320_1$-$320_3$ have been described above in reference to FIGS. 4 and 5.

A person of ordinary skill in the art will understand, without undue experimentation, how to modify circuit 800 to produce a circuit having a different (from three) number of RF stubs, at least some of which may be implemented using stub circuits 320 (FIGS. 4-5).

Circuit 800 comprises an RF transmission line 810 that connects terminals T1 and T2 thereof using four serially connected transmission-line sections, labeled TL1 through TL4, respectively. In an example embodiment, each of sections TL1-TL4 can be implemented, e.g., using a respective microstrip line section formed on a dielectric over a ground plane, as known in the pertinent art. Transmission line 810 can be impedance matched to a standard impedance $Z_0$, e.g., 50 Ohm, e.g., as indicated in FIG. 8. Alternative implementations of transmission line 810 and sections TL1-TL4 are also possible, e.g., as known in the pertinent art.

Stub circuit $320_1$ is connected to transmission line 810 between sections TL1 and TL2, as indicated in FIG. 8, to create a first RF stub thereat. Stub circuit $320_2$ is connected to transmission line 810 between sections TL2 and TL3, as indicated in FIG. 8, to create a second RF stub thereat. Stub circuit $320_3$ is connected to transmission line 810 between sections TL3 and TL4, as indicated in FIG. 8, to create a third RF stub thereat.

Figure 9A:
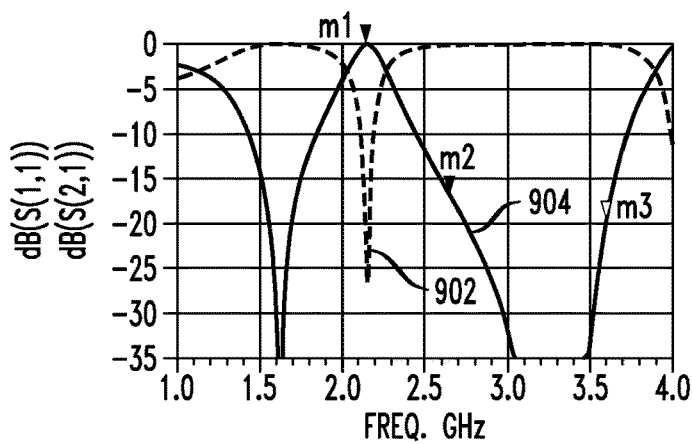
FIGS. 9A-9C graphically illustrate certain frequency characteristics of the electrical circuit of FIG. 8 according to an embodiment.
Figure 9B:
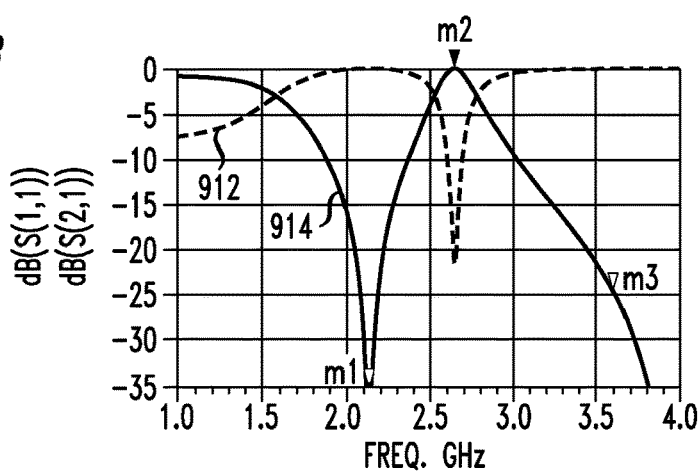
Figure 9C:
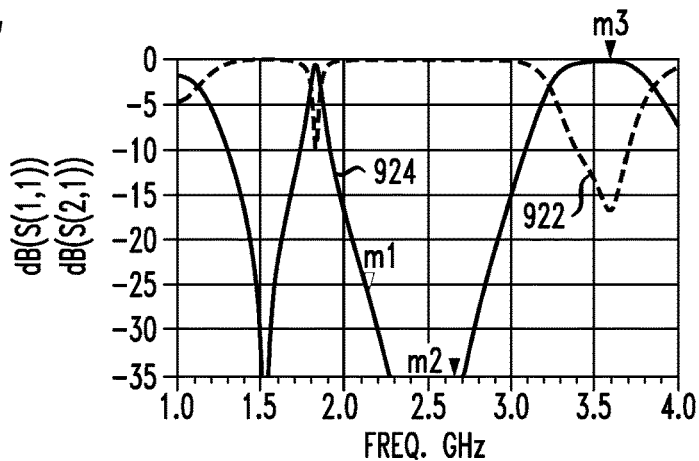

FIGS. 9A-9C graphically illustrate certain frequency characteristics of circuit 800 (FIG. 8) having stub circuits $320_1$-$320_3$ corresponding to FIG. 4. More specifically, each of FIGS. 9A-9C graphically shows the frequency dependence of the amplitudes of the S-parameters S(1,1) and S(2,1) of circuit 800 at various values of the bias voltages $V_{dc}$ (also see FIG. 4). As already indicated above, a change of the bias voltage $V_{dc}$ causes a corresponding change of the effective dielectric constant of structure 100.

Referring to FIG. 9A, curves 902 and 904 shown therein correspond to the S-parameters S(1,1) and S(2,1), respectively, and were obtained by numerical simulations in which the bias voltages $V_{dc}$ were set as follows. The bias voltage $V_{dc}$ of stub circuit $320_1$ was set to the value $V_{A1}$ that resulted in the effective relative dielectric constant, $\varepsilon_{r1}$, of EC layer 108 therein to be $\varepsilon_{r1}$=7.5. The bias voltage $V_{dc}$ of stub circuit $320_2$ was set to the value $V_{A2}$ that resulted in the effective relative dielectric constant, $\varepsilon_{r2}$, of EC layer 108 therein to be $\varepsilon_{r2}$=3.9. The bias voltage $V_{dc}$ of stub circuit $320_3$ was set to the value $V_{A3}$ that resulted in the effective relative dielectric constant, $\varepsilon_{r3}$, of EC layer 108 therein to be $\varepsilon_{r3}$=3.6. The markers m1, m2, and m3 on curve 904 are located at 2.14 GHz, 2.65 GHz, and 3.6 GHz, respectively. The corresponding S(2,1) values are −0.033 dB, −16.819 dB, and −19.817 dB, respectively.

Referring to FIG. 9B, curves 912 and 914 shown therein correspond to the S-parameters S(1,1) and S(2,1), respectively, and were obtained by numerical simulations in which the bias voltages $V_{dc}$ were set as follows. The bias voltage $V_{dc}$ of stub circuit $320_1$ was set to the value $V_{B1}$ that resulted in the effective relative dielectric constant, $\varepsilon_{r1}$, of EC layer 108 therein to be $\varepsilon_{r1}$=4.0. The bias voltage $V_{dc}$ of stub circuit $320_2$ was set to the value $V_{B2}$ that resulted in the effective relative dielectric constant, $\varepsilon_{r2}$, of EC layer 108 therein to be $\varepsilon_{r2}$=2.3. The bias voltage $V_{dc}$ of stub circuit $320_3$ was set to the value $V_{B3}$ that resulted in the effective relative dielectric constant, $\varepsilon_{r3}$, of EC layer 108 therein to be $\varepsilon_{r3}$=2.5. The markers m1, m2, and m3 on curve 914 are located at 2.14 GHz, 2.65 GHz, and 3.6 GHz, respectively. The corresponding S(2,1) values are −57.785 dB, −0.031 dB, and −24.579 dB, respectively.

Referring to FIG. 9C, curves 922 and 924 shown therein correspond to the S-parameters S(1,1) and S(2,1), respectively, and were obtained by numerical simulations in which the bias voltages $V_{dc}$ were set as follows. The bias voltage $V_{dc}$ of stub circuit $320_1$ was set to the value $V_{C1}$ that resulted in the effective relative dielectric constant, $\varepsilon_{r1}$, of EC layer 108 therein to be $\varepsilon_{r1}$=8.6. The bias voltage $V_{dc}$ of stub circuit $320_2$ was set to the value $V_{C2}$ that resulted in the effective relative dielectric constant, $\varepsilon_{r2}$, of EC layer 108 therein to be $\varepsilon_{r2}$=6.2. The bias voltage $V_{dc}$ of stub circuit $320_3$ was set to the value $V_{C3}$ that resulted in the effective relative dielectric constant, $\varepsilon_{r3}$, of EC layer 108 therein to be $\varepsilon_{r3}$=7.8. The markers m1, m2, and m3 on curve 914 are located at 2.14 GHz, 2.65 GHz, and 3.6 GHz, respectively. The corresponding S(2,1) values are −25.644 dB, −43.140 dB, and −0.093 dB, respectively.

Thus, the results shown in FIGS. 9A-9C indicate that circuit 800 can be tuned such that, of three RF bands, e.g., having center frequencies at 2.14 GHz, 2.65 GHz, and 3.6 GHz, respectively, a selected one is substantially passed through while the remaining two are substantially stopped from being transmitted from terminal T1 to terminal T2. In particular, in the configuration of FIG. 9A, the 2.14 GHz band is substantially passed through while the 2.65 and 3.6 GHz bands are substantially stopped. In the configuration of FIG. 9B, the 2.65 GHz band is substantially passed through while the 2.14 and 3.6 GHz bands are substantially stopped. In the configuration of FIG. 9C, the 3.6 GHz band is substantially passed through while the 2.14 and 2.65 GHz bands are substantially stopped.

A person of ordinary skill in the art will understand that different pass/stop band configurations may beneficially be realized with circuit 800 by appropriately changing the bias voltages applied to structures 100 and/or 200 of stub circuits $320_1$-$320_3$.

Figure 10:
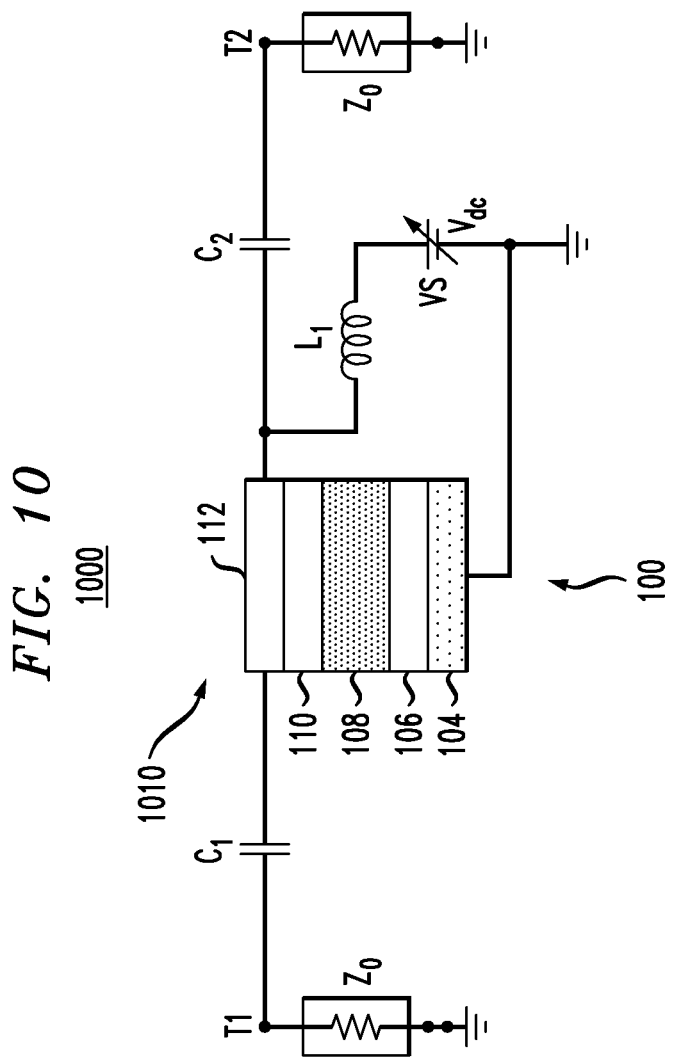
FIG. 10 shows a circuit diagram of an electrical circuit in which the multilayered structure of FIG. 1 can be used according to yet another embodiment.

FIG. 10 shows a circuit diagram of an electrical circuit 1000 according to yet another embodiment. In an example embodiment, circuit 1000 can operate as an electrically tunable phase shifter, e.g., as demonstrated by the results shown in FIGS. 11A-11D. The tunability of circuit 1000 is realized using structure 100 (FIG. 1).

Circuit 1000 comprises an RF transmission line 1010 that connects terminals T1 and T2. Transmission line 1010 comprises capacitors $C_1$ and $C_2$ and a transmission-line section therebetween implemented using structure 100 (FIG. 1). Transmission line 1010 can be impedance matched to a standard impedance $Z_0$, e.g., 50 Ohm, e.g., as indicated in FIG. 10.

Circuit 1000 further comprises a variable voltage source VS connected to apply the bias voltage $V_{dc}$ across structure 100 (also see FIG. 1). The bias voltage $V_{dc}$ can be changed by appropriately controlling the voltage source VS, as known in the pertinent art. Inductor $L_1$ is used to provide dc coupling of the voltage source VS to structure 100. Capacitors $C_1$ and $C_2$ are connected to provide RF coupling of electrode layer 112 of structure 100 to electrical terminals T1 and T2. Capacitors $C_1$ and $C_2$ also serve to substantially decouple electrical terminals T1 and T2 from the dc voltage applied to structure 100 by the voltage source VS.

FIGS. 11A-11D graphically illustrate certain frequency characteristics of circuit 1000 (FIG. 10) according an embodiment.

Figure 11A:
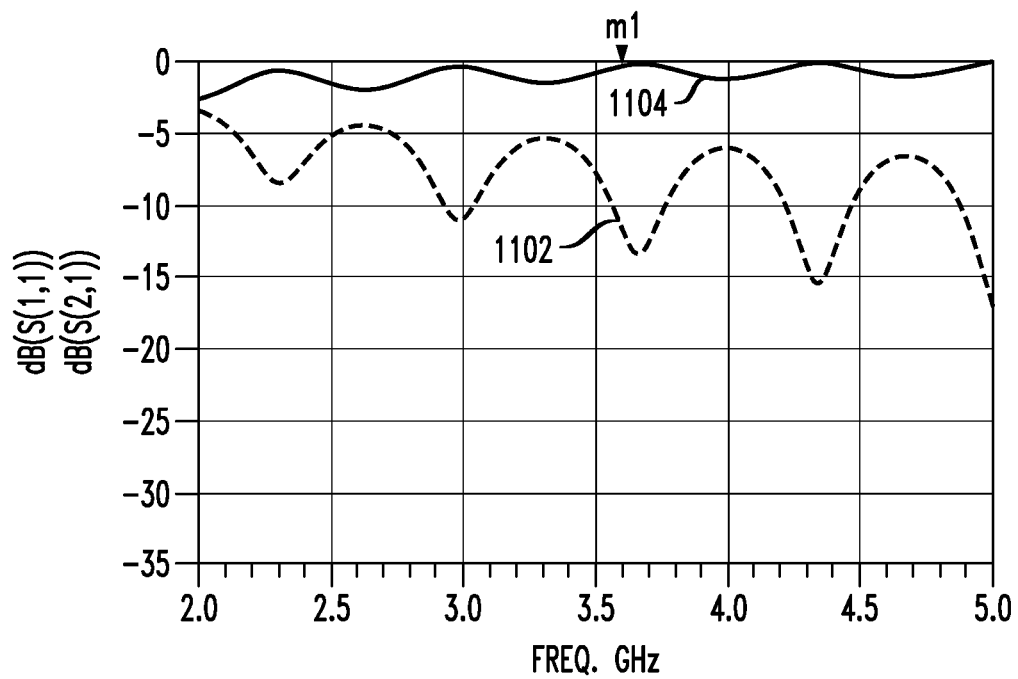
FIGS. 11A-11D graphically illustrate certain frequency characteristics of the electrical circuit of FIG. 10 according to an embodiment.

Referring to FIG. 11A, curves 1102 and 1104 shown therein represent the amplitudes of the S-parameters S(1,1) and S(2,1), respectively, and were obtained by numerical simulations in which the bias voltage $V_{dc}$ was set to the value $V_A$ that resulted in the effective relative dielectric constant, $\varepsilon_r$, of EC layer 108 in circuit 1000 to be $\varepsilon_r=10.1$. The marker m1 on curve 1104 is located at 3.6 GHz and indicates the S(2,1) value of −0.305 dB.

Figure 11B:
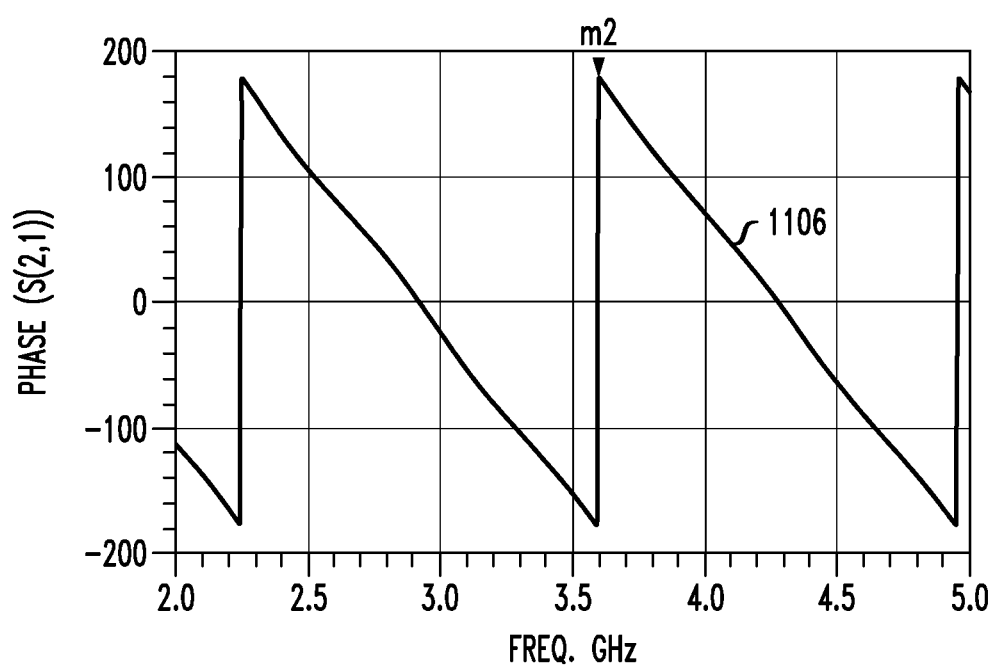

Referring to FIG. 11B, a curve 1106 therein graphically shows the relative phase of the S-parameter S(2,1), the amplitude of which is shown in FIG. 11A by curve 1104. The marker m2 on curve 1106 is located at 3.6 GHz and indicates the relative value of 179 degrees.

Figure 11C:
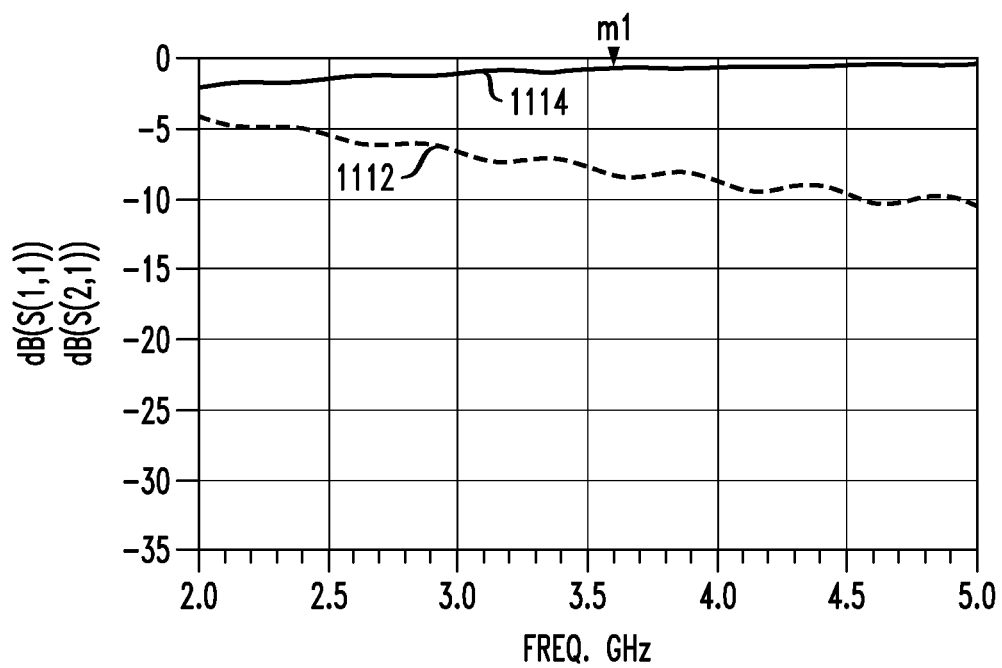

Referring to FIG. 11C, curves 1112 and 1114 shown therein represent the amplitudes of the S-parameters S(1,1) and S(2,1), respectively, and were obtained by numerical simulations in which the bias voltage $V_{dc}$ was set to the value $V_C$ that resulted in the effective relative dielectric constant, $\varepsilon_r$, of EC layer 108 in circuit 1000 to be $\varepsilon_r=20$. The marker m1 on curve 1114 is located at 3.6 GHz and indicates the S(2,1) value of −0.688 dB.

Figure 11D:
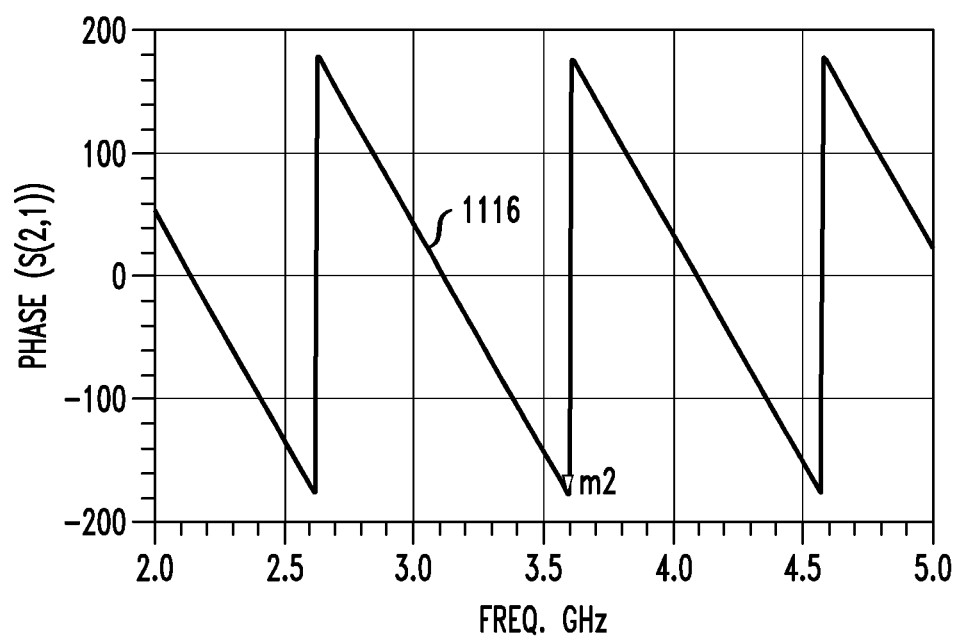

Referring to FIG. 11D, a curve 1116 therein graphically shows the relative phase of the S-parameter S(2,1), the amplitude of which is shown in FIG. 11C by curve 1114. The marker m2 on curve 1116 is located at 3.6 GHz and indicates the relative value of −178 degrees.

Thus, the results shown in FIGS. 11A-11D indicate that the relative phase of a 3.6-GHz signal transmitted from terminal T1 to terminal T2 of circuit 1000 can be controllably and continuously changed in the range between ca. 180 and −180 degrees using the bias voltage values in the range between $V_{dc}=V_A$ and $V_{dc}=V_C$. The corresponding insertion losses are relatively low and may be relatively constant (e.g., substantially voltage-independent) within this voltage range, as indicated by curves 1104 and 1114. A person of ordinary skill in the art will understand that similar results can be obtained for other frequencies using other suitable voltage ranges.

In some embodiments, the voltage source VS of circuit 1000 can be interfaced with a control circuit having stored therein a look-up table (LUT) that lists bias voltages $V_{dc}$ for the various relative phase-shift and frequency values. The LUT can be conveniently accessed, e.g., when the relative phase shift needs to be changed during operation of circuit 1000.

Figure 12:
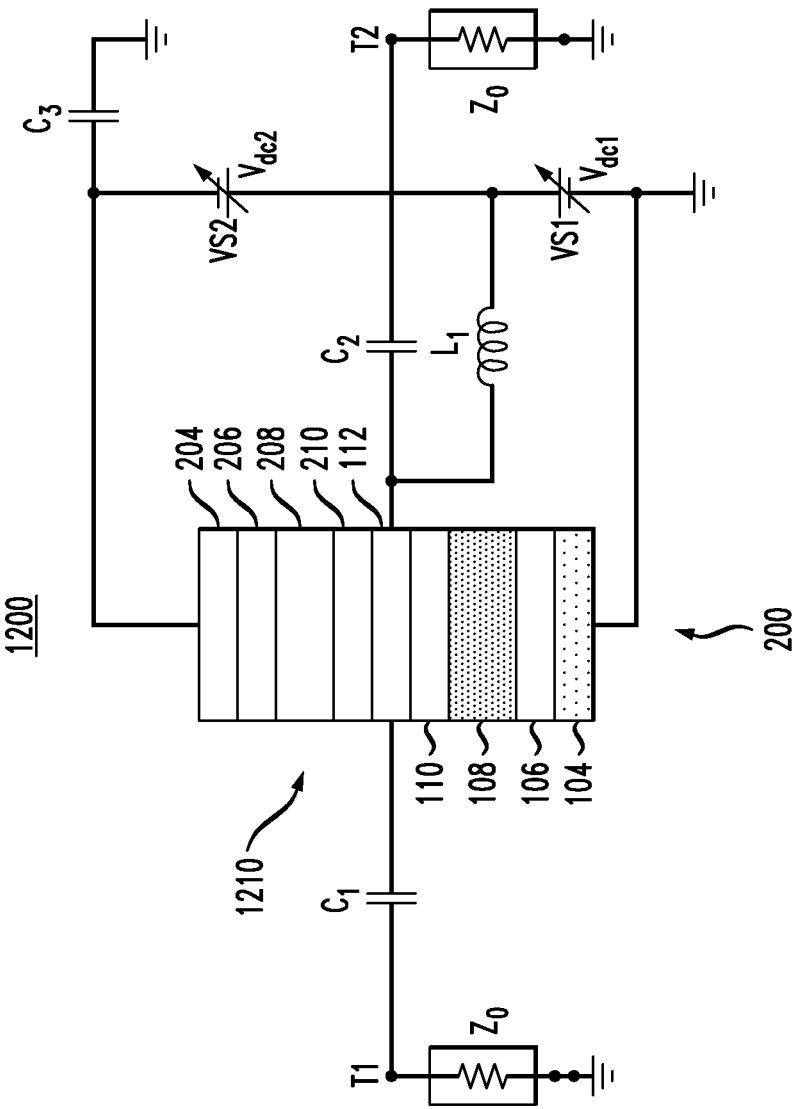
FIG. 12 shows a circuit diagram of an electrical circuit in which the multilayered structure of FIG. 2 can be used according to yet another embodiment.

FIG. 12 shows a circuit diagram of an electrical circuit 1200 according to yet another embodiment. Similar to circuit 1000, circuit 1200 can operate as an electrically tunable phase shifter. The tunability of circuit 1200 is realized using structure 200 (FIG. 2).

Circuit 1200 comprises an RF transmission line 1210 that connects terminals T1 and T2. Transmission line 1210 comprises capacitors $C_1$ and $C_2$ and a transmission-line section therebetween implemented using structure 200 (FIG. 1). Transmission line 1210 can be impedance matched to a standard impedance $Z_0$, e.g., 50 Ohm, e.g., as indicated in FIG. 12.

Circuit 1200 further comprises variable voltage sources VS1 and VS2 connected to apply the bias voltages $V_{dc1}$ and $V_{dc2}$ to structure 200 (also see FIG. 2). The bias voltages $V_{dc1}$ and $V_{dc2}$ can be changed by appropriately controlling the voltage sources VS1 and VS2, as known in the pertinent art. Inductor $L_1$ is used to provide dc coupling of the voltage sources VS1 and VS2 to structure 200. Capacitors $C_1$ and $C_2$ are connected to provide RF coupling of electrode layer 112 of structure 200 to electrical terminals T1 and T2. Capacitors $C_1$ and $C_2$ also serve to substantially decouple electrical terminals T1 and T2 from the dc voltages applied to structure 200 by the voltage sources VS. Capacitor $C_3$ enables the electrode layer 204 to be electrically floated with respect to the ground potential when needed.

In some cases, circuit 1200 may be used instead of circuit 1000, e.g., to reduce the physical size of the corresponding circuit, to reduce the required accessible range of the dielectric constants $\varepsilon_r$ of the EC layer(s) therein, and/or to extend the tunable range while having a limited accessible range of the dielectric constants.

FIG. 13 shows a schematic view of a conventional EC cell 1300 that can be used in some embodiments. EC cell 1300 includes layers 1304, 1306, 1308, 1310, and 1312.

Layers 1304 and 1312 are electrode layers that are configured to be electrically connected to an external voltage source, e.g., supplying a dc bias voltage, $V_{dc}$, as indicated in FIG. 13.

Layer 1306 is an EC layer that may comprise any suitable EC material, such as $WO_3$, $TiO_2$, $MoO_3$, $Ta_2O_5$, $Nb_2O_5$, or any of other above-mentioned or known EC materials.

Layer 1308 is an ion-conductor (e.g., solid electrolyte) layer that serves as a reservoir of ions for injection into/ejection from EC layer 1306. In some embodiments, layer 1308 may comprise lithium niobate ($LiNbO_3$).

Layer 1310 is an ion-storage layer. In some embodiments, layer 1310 may comprise an EC material that exhibits electrochromic characteristics complementary to those of EC layer 1306. In some embodiments, layer 1310 may be made of NiO, $Cr_2O_3$, $MnO_2$, $FeO_2$, $CoO_2$, $RhO_2$, and/or $IrO_2$.

According to an example embodiment disclosed above, e.g., in the summary section and/or in reference to any one or any combination of some or all of FIGS. 1-13, provided is an apparatus comprising an electrical circuit (e.g., 300, FIG. 3; 1000, FIG. 10) connected to process an electrical radio-frequency (RF) signal, the electrical circuit including a first length of RF transmission line adjacent and along a first multilayered structure (e.g., 100, FIG. 1; 200, FIG. 2); and wherein the first multilayered structure comprises a first electrochromic (EC) layer (e.g., 108, FIG. 1A) and first and second ion-conductor layers (e.g., 106, 110, FIG. 1) vertically stacked on a substrate (e.g., 102, FIG. 1), the first EC layer being between the first and second ion-conductor layers.

In some embodiments of the above apparatus, the first multilayered structure further comprises an ion-storage layer (e.g., $108_2$, FIG. 1B) next to the first EC layer and between the first and second ion-conductor layers.

In some embodiments of any of the above apparatus, the first EC layer comprises a first EC material; and wherein the ion-storage layer comprises a second EC material different from the first EC material.

In some embodiments of any of the above apparatus, the first length of RF transmission line and the first multilayered structure are parts of a circuit element (e.g., 1010, FIG. 10) configured to operate on the electrical RF signal as a tunable phase shifter.

In some embodiments of any of the above apparatus, a phase shift imparted on the electrical RF signal in the circuit element is controllable by a dc-bias voltage (e.g., $V_{dc}$, FIG. 10) applied across the first multilayered structure.

In some embodiments of any of the above apparatus, the apparatus is configured to change the dc-bias voltage.

In some embodiments of any of the above apparatus, the electrical circuit includes a second length of RF transmission line (e.g., TL1, FIG. 3) and a third length of RF transmission line (e.g., TL2, FIG. 3) serially connected to one another; and wherein the first length of RF transmission line is end-connected as a stub between the second and third lengths of RF transmission line.

In some embodiments of any of the above apparatus, the electrical circuit includes a fourth length of RF transmission line (e.g., TL3, FIG. 8) and a fifth length of RF transmission line (e.g., part of $320_2$, FIG. 8); wherein the fourth length of RF transmission line is serially connected with the second and third lengths of RF transmission line; and wherein the fifth length of RF transmission line is end-connected as a stub between the third and fourth lengths of RF transmission line.

In some embodiments of any of the above apparatus, the fifth length of RF transmission line is adjacent and along a second multilayered structure (e.g., 100, FIG. 1; 200, FIG. 2), the second multilayered structure comprising an EC layer (e.g., 108, FIG. 4).

In some embodiments of any of the above apparatus, the first, second, and third lengths of RF transmission line and the first multilayered structure are parts of a circuit element (e.g., 310, FIG. 3) configured to operate on the electrical RF signal as a tunable band-stop filter.

In some embodiments of any of the above apparatus, spectral position of a stop band of the tunable band-stop filter is controllable by a dc-bias voltage (e.g., $V_{dc}$, FIG. 3) applied across the first multilayered structure.

In some embodiments of any of the above apparatus, the apparatus is configured to change the dc-bias voltage.

In some embodiments of any of the above apparatus, the stub comprises a capacitor (e.g., $C_1$, FIG. 4) connected to electrically decouple the second and third lengths of RF transmission line from a dc voltage across the first multilayered structure.

In some embodiments of any of the above apparatus, the first multilayered structure further comprises a second EC layer (e.g., 208, FIG. 2) and third and fourth ion-conductor layers (e.g., 206, 210, FIG. 2) vertically stacked on the substrate, the second EC layer being between the third and fourth ion-conductor layers and being at a different offset distance from the substrate than the first EC layer.

In some embodiments of any of the above apparatus, the first multilayered structure further comprises first, second, and third electrode layers (e.g., 104, 112, 204, FIG. 2) vertically stacked on the substrate such that: the first EC layer and the first and second ion-conductor layers are between the first and second electrode layers; and the second EC layer and the third and fourth ion-conductor layers are between the second and third electrode layers.

In some embodiments of any of the above apparatus, the apparatus is configured to individually change a dc-bias voltage (e.g., $V_{dc1}$, FIG. 5) between the first and second electrode layers and a dc-bias voltage (e.g., $V_{dc2}$, FIG. 5) between the second and third electrode layers.

In some embodiments of any of the above apparatus, each of the first and second EC layers comprises an inorganic oxide; wherein each of the first, second, third, and fourth ion-conductor layers comprises a solid electrolyte material; and wherein each of the first, second, and third electrode layers comprises a metal or a metallic alloy.

In some embodiments of any of the above apparatus, the first multilayered structure further comprises first and second electrode layers (e.g., 104, 112, FIG. 1) vertically stacked on the substrate such that the first EC layer and the first and second ion-conductor layers are between the first and second electrode layers.

According to another example embodiment disclosed above, e.g., in the summary section and/or in reference to any one or any combination of some or all of FIGS. 1-13, provided is an apparatus comprising an electrical circuit (e.g., 300, FIG. 3; 800, FIG. 8) connected to process an electrical radio-frequency (RF) signal, the electrical circuit including a first length of RF transmission line (e.g., part of 320, FIG. 4) adjacent and along a first multilayered structure (e.g., 100, FIG. 1; 200, FIG. 2; 1300, FIG. 13), a second length of RF transmission line (e.g., TL1, FIG. 3), and a third length of RF transmission line (e.g., TL2, FIG. 3); wherein the second and third lengths of RF transmission line are serially connected to one another; wherein the first length of RF transmission line is end-connected as a stub between the second and third lengths of RF transmission line; and wherein the first multilayered structure comprises a first electrochromic (EC) layer (e.g., 108, FIG. 1A; 1306, FIG. 13) and a first ion-conductor layer (e.g., 106, FIG. 1A; 1308, FIG. 13) vertically stacked on a substrate (e.g., 102, FIG. 1).

In some embodiments of the above apparatus, the first multilayered structure further comprises a second ion-conductor layer (e.g., 110, FIG. 1A); and wherein the first EC layer and the first and second ion-conductor layers are vertically stacked on the substrate such that the first EC layer is between the first and second ion-conductor layers.

In some embodiments of any of the above apparatus, the electrical circuit includes a fourth length of RF transmission line (e.g., TL3, FIG. 8) and a fifth length of RF transmission line (e.g., part of $320_2$, FIG. 8); wherein the fourth length of RF transmission line is serially connected with the second and third lengths of RF transmission line; and wherein the fifth length of RF transmission line is end-connected as a stub between the third and fourth lengths of RF transmission line.

In some embodiments of any of the above apparatus, the fifth length of RF transmission line is adjacent and along a second multilayered structure (e.g., 100, FIG. 1; 200, FIG. 2; 1300, FIG. 13), the second multilayered structure comprising a second EC layer. In some embodiments of any of the above apparatus, the first, second, and third lengths of RF transmission line and the first multilayered structure are parts of a circuit element (e.g., 310, FIG. 3) configured to operate on the electrical RF signal as a tunable band-stop filter.

According to yet another example embodiment disclosed above, e.g., in the summary section and/or in reference to any one or any combination of some or all of FIGS. 1-13, provided is an apparatus comprising an electrical circuit (e.g., 300, FIG. 3; 1000, FIG. 10) connected to process an electrical radio-frequency (RF) signal, the electrical circuit including a length of RF transmission line adjacent and along a multilayered structure (e.g., 200, FIG. 2); wherein the multilayered structure comprises first and second electrochromic (EC) layers (e.g., 108, 208, FIG. 2; two instances of 1306, FIG. 13) and first, second, and third electrode layers (e.g., 104, 112, 204, FIG. 2) vertically stacked on a substrate, the second electrode layer being between the first and second electrode layers, the first EC layer being between the first and second electrode layers, the second EC layer being between the second and third electrode layers; and wherein the length of RF transmission line comprises the second electrode layer.

In some embodiments of the above apparatus, the multilayered structure further comprises first and second ion-conductor layers vertically stacked on the substrate, the first EC layer being between the first and second ion-conductor layers (e.g., 106, 110, FIG. 2), the first and second ion-conductor layers being the first and second electrode layers.

In some embodiments of any of the above apparatus, the multilayered structure further comprises third and fourth ion-conductor layers (e.g., 206, 210, FIG. 2) vertically stacked on the substrate, the second EC layer being between the third and fourth ion-conductor layers, the third and fourth ion-conductor layers being between the second and third electrode layers.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Throughout the detailed description, the drawings, which are not to scale, are illustrative only and are used in order to explain, rather than limit the disclosure. The use of terms such as height, length, width, top, bottom, is strictly to facilitate the description of the embodiments and is not intended to limit the embodiments to a specific orientation. For example, height does not imply only a vertical rise limitation, but is used to identify one of the three dimensions of a three dimensional structure as shown in the figures. Such "height" would be vertical where the electrodes are horizontal but would be horizontal where the electrodes are vertical, and so on. Similarly, while all figures show the different layers as horizontal layers such orientation is for descriptive purpose only and not to be construed as a limitation.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

What is claimed is:

1. An apparatus comprising an electrical circuit connected to process an electrical radio-frequency (RF) signal, the electrical circuit including a first length of RF transmission line adjacent and along a first multilayered structure; and
   wherein the first multilayered structure comprises a first electrochromic (EC) layer and first and second ion-conductor layers vertically stacked on a substrate, the first EC layer being between the first and second ion-conductor layers and being directly attached to each of the first and second ion-conductor layers.

2. An apparatus comprising an electrical circuit connected to process an electrical radio-frequency (RF) signal, the electrical circuit including a first length of RF transmission line adjacent and along a first multilayered structure; and
   wherein the first multilayered structure comprises a first electrochromic (EC) layer and first and second ion-conductor layers vertically stacked on a substrate, the first EC layer being between the first and second ion-conductor layers, each of the first and second ion-conductor layers serving as a respective reservoir of ions for injection into the first EC layer or for ejection from the first EC layer.

3. The apparatus of claim 2, wherein the first multilayered structure further comprises first and second electrode layers vertically stacked on the substrate such that the first EC layer and the first and second ion-conductor layers are between the first and second electrode layers.

4. The apparatus of claim 2, wherein the first length of RF transmission line and the first multilayered structure are parts of a circuit element configured to operate on the electrical RF signal as a tunable phase shifter.

5. The apparatus of claim 4, wherein a phase shift imparted on the electrical RF signal in the circuit element is controllable by a dc-bias voltage applied across the first multilayered structure.

6. The apparatus of claim 5, wherein the apparatus is configured to change the dc-bias voltage.

7. The apparatus of claim 2,
wherein the electrical circuit includes a second length of RF transmission line and a third length of RF transmission line serially connected to one another; and
wherein the first length of RF transmission line is end-connected as a stub between the second and third lengths of RF transmission line.

8. The apparatus of claim 7,
wherein the electrical circuit includes a fourth length of RF transmission line and a fifth length of RF transmission line;
wherein the fourth length of RF transmission line is serially connected with the second and third lengths of RF transmission line; and
wherein the fifth length of RF transmission line is end-connected as a stub between the third and fourth lengths of RF transmission line.

9. The apparatus of claim 8, wherein the fifth length of RF transmission line is adjacent and along a second multilayered structure, the second multilayered structure comprising an EC layer.

10. The apparatus of claim 7, wherein the first, second, and third lengths of RF transmission line and the first multilayered structure are parts of a circuit element configured to operate on the electrical RF signal as a tunable band-stop filter.

11. The apparatus of claim 10, wherein spectral position of a stop band of the tunable band-stop filter is controllable by a dc-bias voltage applied across the first multilayered structure.

12. The apparatus of claim 11, wherein the apparatus is configured to change the dc-bias voltage.

13. The apparatus of claim 7, wherein the stub comprises a capacitor connected to electrically decouple the second and third lengths of RF transmission line from a dc voltage across the first multilayered structure.

14. The apparatus of claim 2, wherein the first multilayered structure further comprises a second EC layer and third and fourth ion-conductor layers vertically stacked on the substrate, the second EC layer being between the third and fourth ion-conductor layers and being at a different offset distance from the substrate than the first EC layer.

15. The apparatus of claim 14, wherein the first multilayered structure further comprises first, second, and third electrode layers vertically stacked on the substrate such that:
the first EC layer and the first and second ion-conductor layers are between the first and second electrode layers; and
the second EC layer and the third and fourth ion-conductor layers are between the second and third electrode layers.

16. The apparatus of claim 15, wherein the apparatus is configured to individually change a dc-bias voltage between the first and second electrode layers and a dc-bias voltage between the second and third electrode layers.

17. The apparatus of claim 15,
wherein each of the first and second EC layers comprises an inorganic oxide;
wherein each of the first, second, third, and fourth ion-conductor layers comprises a solid electrolyte material; and
wherein each of the first, second, and third electrode layers comprises a metal or a metallic alloy.

18. An apparatus comprising an electrical circuit connected to process an electrical radio-frequency (RF) signal, the electrical circuit including a first length of RF transmission line adjacent and along a first multilayered structure, a second length of RF transmission line, and a third length of RF transmission line;
wherein the second and third lengths of RF transmission line are serially connected to one another;
wherein the first length of RF transmission line is end-connected as a stub between the second and third lengths of RF transmission line; and
wherein the first multilayered structure comprises a first electrochromic (EC) layer and a first ion-conductor layer vertically stacked on a substrate.

19. The apparatus of claim 18, wherein the first, second, and third lengths of RF transmission line and the first multilayered structure are parts of a circuit element configured to operate on the electrical RF signal as a tunable band-stop filter.

20. The apparatus of claim 18,
wherein the first multilayered structure further comprises a second ion-conductor layer; and
wherein the first EC layer and the first and second ion-conductor layers are vertically stacked on the substrate such that the first EC layer is between the first and second ion-conductor layers.

21. The apparatus of claim 18,
wherein the electrical circuit includes a fourth length of RF transmission line and a fifth length of RF transmission line;
wherein the fourth length of RF transmission line is serially connected with the second and third lengths of RF transmission line; and
wherein the fifth length of RF transmission line is end-connected as a stub between the third and fourth lengths of RF transmission line.

22. The apparatus of claim 21, wherein the fifth length of RF transmission line is adjacent and along a second multilayered structure, the second multilayered structure comprising a second EC layer.

23. An apparatus comprising an electrical circuit connected to process an electrical radio-frequency (RF) signal, the electrical circuit including a length of RF transmission line adjacent and along a multilayered structure;
wherein the multilayered structure comprises first and second electrochromic (EC) layers and first, second, and third electrode layers vertically stacked on a substrate, the second electrode layer being between the first and third electrode layers, the first EC layer being between the first and second electrode layers, the second EC layer being between the second and third electrode layers; and wherein the length of RF transmission line comprises the second electrode layer.

24. The apparatus of claim 23, wherein the multilayered structure further comprises first and second ion-conductor layers vertically stacked on the substrate, the first EC layer being between the first and second ion-conductor layers, the first and second ion-conductor layers being between the first and second electrode layers.

25. The apparatus of claim 23, wherein the multilayered structure further comprises third and fourth ion-conductor layers vertically stacked on the substrate, the second EC layer being between the third and fourth ion-conductor layers, the third and fourth ion-conductor layers being between the second and third electrode layers.

* * * * *